United States Patent [19]

Dean

[11] Patent Number: 4,614,765

[45] Date of Patent: Sep. 30, 1986

[54] MOLDING COMPOSITION CONTAINING FUNCTIONALIZED THERMOPLASTIC RUBBER AND METHOD

[75] Inventor: Barry D. Dean, Broomall, Pa.

[73] Assignee: Atlantic Richfield Company, Los Angeles, Calif.

[21] Appl. No.: 717,759

[22] Filed: Mar. 29, 1985

[51] Int. Cl.$^4$ .............................................. C08L 53/00
[52] U.S. Cl. ....................... 525/93; 525/95; 525/96; 525/332.9; 525/337
[58] Field of Search ................. 525/96, 332.9, 337, 525/93, 95

[56] References Cited

U.S. PATENT DOCUMENTS

| | | | |
|---|---|---|---|
| 4,243,766 | 1/1981 | Abolins et al. | 525/96 |
| 4,269,871 | 5/1981 | Blommers et al. | 525/96 |
| 4,444,952 | 4/1984 | Feinberg et al. | 525/96 |

*Primary Examiner*—Jacob Ziegler
*Attorney, Agent, or Firm*—Dennis M. Kozak

[57] ABSTRACT

A thermoplastic molding composition which comprises a blend of:

(A) a copolymer having recurring units of a monoalkenyl aromatic monomer and recurring units of an $\alpha,\beta$-ethylenically unsaturated dicarboxylic anhydride N-substituted imide, and (B) a hydrogenated elastomeric block copolymer having at least one substantially completely hydrogenated diene polymer mid block and at least two monoalkenyl arene polymer end blocks in which at least a portion of the arene groups contained in the end blocks are substituted with at least one substituent selected from the group consisting of nitrol, cyano and trifluromethanesulfonyl.

24 Claims, No Drawings

MOLDING COMPOSITION CONTAINING FUNCTIONALIZED THERMOPLASTIC RUBBER AND METHOD

This invention relates to moldable compositions.

In one of its more specific aspects this invention relates to a thermoplastic molding composition which comprises a blend of (A) a copolymer of recurring units of a monoalkenyl aromatic monomer, an $\alpha,\beta$-ethylenically unsaturated dicarboxylic anhydride N-substituted imide and, optionally, a vinyl monomer and (B) an elastomer having a polymer graft which is thermodynamically miscible with (A).

Impact modification of moldable monoalkenyl aromatic polymers can be accomplished either by insitu polymerization of the monomer units in the presence of an elastomeric polymer or by modification of the elastomeric polymer so as to introduce graft species which exhibit an interaction (chemical or physical) with the monoalkenyl aromatic polymer. One of the preferred interactions which is sought is that of thermodynamic miscibility i.e., two polymers which when blended with one another, exhibit physical and rheological properties synonomous with a single polymer phase. However, the miscibility of the two polymers in a blend is typically the exception not the rule and so when miscibility interactions result from the specific modification of one or more of the polymer components of a blend, they are unexpected but desired because unique and useful properties are obtained.

This invention provides impact modified high heat, monoalkenyl aromatic co- and terpolymers prepared via modification of a thermoplastic elastomer such that at least one block segment of the thermoplastic elastomer is thermodynamically miscible with the monoalkenyl aromatic co- or terpolymer.

According to this invention there is provided a thermoplastic molding composition which comprises a blend of (A) a copolymer of recurring units of a monoalkenyl aromatic monomer and recurring units of an $\alpha,\beta$-ethylenically unsaturated dicarboxylic anhydride N-substituted imide and (B) a hydrogenated elastomeric block copolymer having at least one substantially completely hydrogenated diene polymer mid block and at least two monoalkenyl arene polymer end blocks in which at least a portion of the arene groups contained in the end blocks are substituted with at least one substituent selected from the group consisting of nitro, cyano and trifluoromethanesulfonyl.

In a preferred embodiment, copolymer (A) also comprises recurring units of a vinyl monomer which incorporates in a random or alternating fashion with both the monoalkenyl aromatic monomer and the $\alpha,\beta$-ethylenically unsaturated dicarboxylic anhydride imide.

Also, according to this invention, there is provided a method of producing a molded composition which comprises forming a blend of (A) a copolymer of recurring units of a monoalkenyl aromatic monomer and recurring units of an $\alpha,\beta$-ethylenically unsaturated dicarboxylic anhydride N-substituted imide and (B) a hydrogenated elastomeric block copolymer having at least one substantially completely hydrogenated diene polymer mid block and at least two monoalkenyl arene polymer end blocks in which at least a portion of the arene groups contained in the end blocks are substituted with at least one substituent selected from the group consisting of nitro, cyano and trifluoromethonesulfonyl, and molding the resulting blend.

According to this invention there is also provided a molded composition comprising a continuous phase comprising a copolymer having recurring units of a monoalkenyl aromatic monomer and recurring units of an $\alpha,\beta$-ethylenically unsaturated dicarboxylic anhydride N-substituted imide and a disperse phase within the continuous phase, the disperse phase being a hydrogenated elastomeric block copolymer having at least one substantially completely hydrogenated diene polymer mid block and at least two monoalkenyl arene polymer end block in which at least a portion of the arene groups contained in the end blocks are substituted with at least one substituent selected from the group consisting of nitro, cyano and trifluoromethanesulfonyl.

Any suitable monoalkenyl aromatic monomer can be employed in copolymer (A).

Preferably, the monoalkenyl aromatic monomer of copolymer (A) is selected from the group consisting of styrene, $\alpha$-methylstyrene, t-butylstyrene and p-methylstyrene. The most preferred monoalkenyl aromatic monomer is styrene.

Any suitable $\alpha,\beta$-ethylenically unsaturated dicarboxylic anhydride imide can be employed in copolymer (A).

Preferably, the $\alpha,\beta$-ethylenically unsaturated dicarboxylic anhydride N-substituted imide monomer of copolymer (A) is an N-arylmaleimide selected from the group consisting of N-phenylmaleimide, N-tolylmaleimide, N-(chlorophenyl)maleimide, N-(bromophenyl)maleimide and N-(methoxyphenyl)maleimide. The most preferred $\alpha,\beta$-ethylenically unsaturated dicarboxylic anhydride N-substituted imide is N-phenylmaleimide.

Optionally, copolymer (A) may include recurring units of a suitable vinyl monomer. Preferably, the vinyl monomer is selected from the group consisting of maleic anhydride, maleimide, acrylonitrile, and methylmethacrylate.

Preferably, copolymer (A) is comprised of 35 to 45 weight percent monoalkenyl aromatic monomer, 35 to 65 weight percent $\alpha,\beta$-ethylenically unsaturated dicarboxylic anhydride imide and 0 to 20 weight percent of the third vinyl monomer. If the vinyl monomer is employed, it will be employed in an amount of from about 1 to about 20 weight percent.

The number average molecular weight of copolymer (A) should be between about 100,000 to about 700,000. Preferably, the number average molecular weight will be between about 250,000 to about 450,000.

The elastomeric block copolymers (B) is a hydrogenated block copolymer comprising at least two monoalkenyl arene polymer end blocks and at least one substantially completely hydrogenated diene polymer mid block wherein the monoalkenyl arene polymer end blocks have been reacted to form substituted monoalkenyl arene polymer end blocks with the substituent groups being nitro($-NO_2$), cyano($-CN$) or trifluoromethanesulfonyl($-SO_2CF_3$). The preparation of the hydrogenated block copolymers upon which the elastomeric block copolymer (B) of this invention is based are described in U.S. Pat. Nos. 3,595,942 and 4,377,647 the teachings of which are incorporated herein. Suitable for use as the hydrogenated block copolymer which forms the basis for the elastomeric block copolymers of this invention are several thermoplastic rubbers designated Kraton ® G thermoplastic rubbers (TPR), commercially available from Shell Chemical Company. Particularly suitable for use are Kraton G1650 TPR, Kraton G1651 TPR and Kraton G1652 TPR.

Kraton G1650 TPR is a styrene-ethylene-butylene-styrene (SEBS) block copolymer having a styrene/rubber ratio of 28/72.

Kraton G1651 TPR is a SEBS block copolymer having a styrene/rubber ratio of 33/67.

Kraton G1652 TPR is a SEBS block copolymer having a styrene/rubber ratio of 29/71.

The degree of functionalization of elastomeric block copolymer (B) as required by this invention is specific to each substituent group. The preferred level of substitution of available arene groups in the monoalkenyl arene polymer end blocks is, on a weight percent basis, from about 12 to about 32 for the nitro(—$NO_2$) moiety, from about 12 to about 50 for the cyano(—CN) moiety and from about 15 to about 32 for the trifluoromethanesulfonyl moiety. Following Examples 3, 4 and 5 demonstrate the preparation of three elastomeric block copolymers (B) suitable for use in this invention. Each example demonstrates the utilization of a different substituent group for functionalization of a hydrogenated block copolymer.

Any suitable hydrogenated diene polymer mid block can be employed. Preferably, the hydrogenated diene polymer mid block will be the hydrogenated form of either polybutadiene or polyisoprene, preferably the hydrogenated form of polybutadiene. The hydrogenated diene polymer mid block will have a number average molecular weight of between about 20,000 to about 300,000, preferably between about 80,000 to 250,000.

Any suitable monoalkenyl arene polymer end blocks can be employed in elastomeric block copolymer (B). Preferably, the monoalkenyl arene polymer end blocks will be either polystyrene or poly(alpha-methylstyrene). Polystyrene is most preferred.

The number average molecular weight of each monoalkenyl arene polymer end block should be between about 5,000 to 150,000, preferably between about 10,000 to 80,000.

The thermoplastic molding composition of this invention comprises 99 to 1 weight percent of copolymer (A) and 1 to 99 weight percent of elastomeric block copolymer (B). Preferably, the thermoplastic molding composition will comprise 99 to 60 weight percent of copolymer (A) and 1 to 40 weight percent of elastomeric block copolymer (B).

EXAMPLE 1

This example serves to demonstrate the preparation of a copolymer suitable for use as component (A) of this invention.

A one liter glass bowl reactor was charged with 500 grams of water. The water was heated to 60° C. and degassed with a stream of nitrogen. The water was cooled to 35° C. at which time the following ingredients were added: 3.14 grams of tricalcium phosphate, 0.046 grams of sodium bisulfite, 155.6 grams of N-phenylmaleimide, and 93.7 grams of styrene containing 0.64 t-butylperoctoate and 0.06 grams t-butylperbenzoate. The reaction temperature was raised to 75° C. and held for one hour. The temperature was then raised to 120° C. for 2.5 hours. The yellow beads which formed were slurried in 10% aqueous HCL, filtered and washed with water. The styrene/N-phenylmaleimide copolymer was found to contain 63.1 weight percent N-phenylmaleimide via a nitrogen analysis. The copolymer exhibited a glass transition temperature of 224° C. by differential scanning calorimetry (DSC) and a number average molecular weight of 382,000 by gel permeation chromatography versus a monodisperse polystyrene standard. The bead product was stabilized with 5.48 grams (2.2 weight %) of Ultranox ™ 256 antioxidant (a polymeric, sterically hindered phenol; Borg-Warner Chemicals, Inc.) and extruded into pellets.

EXAMPLE 2

This example serves to demonstrate the preparation of a copolymer suitable for use as component (A) of this invention containing recurring units of a third vinyl monomer.

A 1-gallon glass bowl reactor was charged with 400 grams of styrene, 108 grams of N-phenylmaleimide and 60 grams of acrylonitrile. The resulting solution was degassed with nitrogen for ten minutes. Eight milliliters of a 0.014 m solution of t-butylperpivalate (Lupersol ®-11 initiator) in styrene was added and the reactor contents brought to 82° C. Periodic additions of the initiator solution (8 ml) were performed at 30, 60 and 90 minutes with the total reaction time being 120 minutes. The polymer was recovered by precipitation into methanol. The resulting polymer powder was analyzed for N-phenylmaleimide and acrylonitrile content by nitrogen analysis and infrared spectroscopic analysis. The weight percent composition of the polymer was found to be 40% styrene, 48% N-phenylmaleimide and 12% acrylonitrile. The S/N-PMI/AN polymer exhibited a glass transition temperature of 171° C. by DSC and a number average molecular weight of 218,000 by gel permeation chromatography. The polymer was stabilized with 1.0 weight percent N,N-diphenyl-p-phenylene diamine and 1.0 weight percent tris(dinonylphenyl)phosphite then extruded into pellets.

EXAMPLE 3

This example serves to demonstrate the C-cyanation of the monoalkenyl arene polymer end blocks of Kraton ® G1650 thermoplastic rubber (TPR) (Shell Chemical Company). Kraton G1650 TRP comprises 28 percent by weight monoalkenyl arene polymer end blocks and 72 percent by weight hydrogenated diene polymer mid block. The resulting elastomeric block copolymer is suitable for use as component (B) in the practice of this invention.

Thallium (III) oxide (19.4 g, 77 mole) was stirred in 75 ml trifluoroacetic acid shielded from light at 65° C. for 82 hours. The thallium (III) trifluoroacetate was recovered as a colorless solid by evaporation of the solvent under reduced pressure.

Kraton G1650 TPR (100 grams) was dissolved in 800 ml of dry benzonitrile and thallium (III) trifluoroacetate (41.1 g 77 mmole) was added. The mixture was stirred at 25° C. for 12 hours. The solution was diluted with 200 grams of pyridine and 13.7 grams of cuprous cyanide (154 mmole) was added. The reaction mixture was heated to 115° C. for 12 hours. The cyanated Kraton G1650 TPR was recovered by precipitation into methanol. The pale yellow crumb was redissolved and precipitated twice, first in toluene then tetrahydrofuran. Methanol was the nonsolvent in both instances. The functionalized Kraton G1650 TPR was dissolved in tetrahydrofuran and treated with 2% aqueous sodium hydroxide. The elastomer was recovered by precipitation into methanol. Table 1 compares the properties of Kraton G1650 elastomer with those of the C-cyanated version.

TABLE I

| Property | Kraton ® G1650 TPR | C-cyanated Kraton ® G1650 TPR |
|---|---|---|
| Tg (°C.)[1] | 94 | 106 |
| Mn[2] | 113,654 | 114,080 |
| % N | <0.1 | 0.7 |
| IR (2237 cm$^{-1}$) (—NO$_2$ absorbance) | No | Yes |

[1]Glass Transition Imperature of the monoalkenyl arene polymer end blocks as measured by differential scanning calorimetry.
[2]Number average molecular weight as measured by gel permeation chromatography versus monodisperse polystyrene.

The weight percent of available arene units of the monoalkenyl arene polymer end blocks bearing a cyano functionality was found to be 23.

EXAMPLE 4

This example serves to demonstrate functionalization of the monoalkenyl arene polymer end blocks of Kraton G1650 TPR with the trifluoromethanesulfonyl group. The elastomeric block copolymer is suitable for use as component (B) in the practice of this invention.

Kraton G1650 TPR (100 grams) was dissolved in 800 ml of dry heptane. The Kraton G TPR/heptane solution was treated with 9.1 grams (54 mmoles) of trifluoromethanesulfonyl chloride under an inert atmosphere at 20° C. Four milliliters of a 1.0M aluminum trichloride/nitrobenzene solution were added and the reaction was allowed to proceed at 20° C. for 36 hours. The functionalized Kraton G TPR was recovered by precipitation into methanol/water (80:20 v/v). The polymer crumb recovered was redissolved in monochlorobenzene and precipitated into methanol/water (80:20 v/v). This dissolution/precipitation procedure was repeated twice. Table II compares the properties of Kraton G1650 TRP with those of the trifluoromethanesulfone version.

TABLE II

| | Kraton ® G1650 TPR | Kraton ® G1650 TPR Functionalized with —SO$_2$CF$_3$ |
|---|---|---|
| Tg (°C.) | 94 | 111 |
| M$_n$ | 113,654 | 116,710 |
| % S | <0.05 | 0.75 |
| % F | <0.05 | 1.35 |
| IR (1325 and 1152 cm$^{-1}$) (—SO$_2$ absorbance) | No | Yes |

Other Lewis acid catalysts can be utilized to effect the functionalization of the monoalkenyl arene polymer end blocks such as boron trifluoride (BF$_3$) stannic chloride (SnCl$_4$) and the like.

EXAMPLE 5

This example serves to demonstrate functionalization of the monoalkenyl arene polymer end blocks of Kraton G1650 TPR with the nitro moiety. The resulting elastomeric block copolymer is suitable for use as component (B) in the practice of this invention.

N-Nitrotetrafluoroborate salt of 2-picoline was prepared by forming a solution of 2-picoline (5.58 grams, 60 mmoles) in 30 milliliters of acetonitrile and treating the solution with 120 milliliters of 0.5M nitronium tetrafluoroborate in tetramethylene sulfone. The reaction medium temperature was maintained at 20° C. for one hour. This nitrating reagent was added to a 20 weight percent solution of Kraton G1650 TPR (100 grams) in methylene dichloride. During the addition of the nitration reagent, the temperature was maintained at 25° C. Once all of the nitration reagent had been added, stirring was continued for 3.5 hours. The polymer was recovered by precipitation into methanol. The pale yellow crumb was further purified by the dissolution/precipitation cycles, (1) dichloromethane:methanol/H$_2$O and (2) dichloromethane:methanol. Other suitable nitrating reagents which could be employed are nitronium tetrafluoroborate, acetylnitrate, nitric acid or sulfuric acid/nitric acid. Table III compares the properties of Kraton G1650 TPR elastomer with those of the nitrated Kraton G TPR.

TABLE III

| | Kraton ® G1650 TPR | Nitrated Kraton ® G1650 TPR |
|---|---|---|
| Tg (°C.) | 94 | 122 |
| Mn | 113,654 | 109,560 |
| % N | >0.1 | 0.63 |
| IR (1542 and 1320 cm$^{-1}$) (—NO$_2$ absorbance) | No | Yes |

EXAMPLE 6

This example serves to demonstrate the thermodynamic miscibility of the functionalized monoalkenyl arene polymer end block copolymers of Examples 3, 4 and 5 with the styrene/N-phenylmaleimide copolymer of Example 1.

Miscibility was determined by a single glass transition temperature intermediate between the Tg's of the pure components. Blends were prepared by separately dissolving 9 grams of each of the functionalized Kraton G1650 TPR block copolymers of Examples 3, 4 and 5 and 2.5 grams of the S/N-PMI copolymer of Example I in 180 grams of methylene dichloride followed by precipitation and drying. Table IV outlines the polymer blend compositions and the respective glass transition temperatures as measured by differential scanning calorimetry.

TABLE IV

| Copolymer | weight percent | | | | |
|---|---|---|---|---|---|
| S/N—PMI (Example 1) | 100 | 22 | 22 | 22 | 22 |
| Kraton G1650 TPR | — | 78 | — | — | — |
| Functionalized Kraton G1650 TPR (—CN) (Example 3) | — | — | 78 | — | — |
| Functionalized Kraton G1650 TPR (—SO$_2$CF$_3$) (Example 4) | — | — | — | 78 | — |
| Functionalized Kraton G1650 TPR (—NO$_2$) (Example 5) | — | — | — | — | 78 |
| TG (°C., DSC) | 224 | 94,224 | 159 | 161 | 169 |

EXAMPLE 7

This example serves to demonstrate the thermodynamic miscibility of the functionalized monoalkenyl arene polymer end block copolymers of Examples 3, 4 and 5 with the styrene/N-phenylmaleimide/acrylonitrile terpolymers of Example 2. Blends were prepared as cited in Example 6. Table V outlines the polymer blend compositions and the respective glass transition temperatures as measured by differential scanning calorimetry.

TABLE V

| | weight percent | | | | |
|---|---|---|---|---|---|
| S/N—PMI/AN (Example 2) | 100 | 22 | 22 | 22 | 22 |
| Kraton G1650 TPR | — | 78 | — | — | — |
| Functionalized Kraton G1650 TPR (—CN) (Example 3) | — | — | 78 | — | — |
| Functionalized Kraton G1650 TPR (—SO$_2$CF$_3$) (Example 4) | — | — | — | 78 | — |
| Functionalized Kraton G1650 TPR (—NO$_2$) (Example 5) | — | — | — | — | 78 |
| TG (°C., DSC) | 171 | 94,171 | 136 | 139 | 146 |

EXAMPLE 8

This example serves to demonstrate the excellent impact strength of blends of this invention involving S/N-PMI copolymer or S/N-PMI/AN copolymer with Kraton G1650 TPR having functionalized monoalkenyl arene polymer end blocks (Table VI). Blends were prepared by dissolving both copolymers in methylene dichloride followed by precipitation into methanol. Test specimens for the notched Izod impact test (ASTM D-256) were prepared by compression molding at 495° F. and 35,000 psi pressure.

TABLE VI

| | weight percent | | | | | | | | | |
|---|---|---|---|---|---|---|---|---|---|---|
| Copolymer | C | C | I | I | I | C | C | I | I | I |
| S/N—PMI (Example 1) | 100 | 75 | 75 | 75 | 75 | — | — | — | — | — |
| S/N—PMI/AN (Example 2) | — | — | — | — | — | 100 | 75 | 75 | 75 | 75 |
| Kraton ® G1650 TPR | — | 25 | — | — | — | — | 25 | — | — | — |
| Functionalized Kraton ® TPR (—CN) (Example 3) | — | — | 25 | — | — | — | — | 25 | — | — |
| Functionalized Kraton ® TPR (—SO$_2$CF$_3$) (Example 4) | — | — | — | 25 | — | — | — | — | 25 | — |
| Functionalized Kraton ® G1650 TPR (—NO$_2$) (Example 5) | — | — | — | — | 25 | — | — | — | — | 25 |
| Property | | | | | | | | | | |
| Notched Izod Impact Strength (ft-lbs/in) | 0.6 | 0.7 | 3.0 | 2.9 | 3.7 | 0.6 | 0.6 | 3.1 | 3.2 | 4.3 |

C = control
I = invention

EXAMPLE 9

This example serves to demonstrate a molding composition comprising 750 grams of the styrene/N-phenylmaleimide/acrylonitrile terpolymer of Example 2, 250 grams of Kraton G1650 TPR having monalkenyl arene polymer end blocks which have been functionalized with the nitro moiety (Example 5) and 20 grams of 1,3,5-trimethyl-2,4,6-tris(3,5-di-tert-butyl-4-hydroxylbenzyl)benzene [Ethanox ®330 antioxidant, Ethyl Corporation]. The composition was extruded, pelletized and molded into test specimens for physical property analysis (Table VII).

TABLE VII

| Property | ASTM | |
|---|---|---|
| Tg (°C., DSC) | | 165 |
| DTUL (⅛" unannealed °F. @ 264 psi) | D-648 | 267 |
| Vicat (°C.) | | 138 |
| Tensile Str. (psi) | D-638 | 5050 |

TABLE VII-continued

| Property | ASTM | |
|---|---|---|
| Flex Str. (psi) | D-790 | 9870 |
| Flex Mod. (psi) | D-790 | 386,000 |
| Notched Izod (ft-lbs/in) | D-256 | 3.9 |
| Gardner Falling Weight Index (in-lbs)[1] | | 192 |
| Elongation (%) | D-638 | 26 |

[1] 1¼" diameter orifice and an 8 lb ½" diameter weight

EXAMPLE 10

This example serves to demonstrate that the thermoplastic molding compositions of this invention can be blended with other engineering thermoplastic materials such as polycarbonate.

Thus, 550 grams of an aromatic polycarbonate (Merlon M-50 resin) (Mobay Chemical Co.) and 450 grams of the thermoplastic molding composition of Example 9 were melt blended in an extruder, pelletized and test specimens were prepared for physical property analysis (Table VIII).

TABLE VIII

| Tg (°C., DSC) | 169 |
|---|---|
| Tensile Str. (psi) | 8,900 |
| Flex Mod. (psi) | 347,000 |
| DTUL (⅛", °F.) | 270 |
| Notched Izod (ft-lbs/in) | 16.4 |
| GFWI (in-lbs) | 480+ |
| Elongation (%) | 85 |

In addition to blending with other engineering theroplastics, the molding composition of this invention can also include other ingredients such as extruders, processing aids, pigments, mold release agents and the like, for their conventionally employed purpose. Also, reinforcing fillers in amounts sufficient to impart reinforcement can be used, such as glass flakes and chipped glass fibers.

It will be evident from the foregoing that various modifications can be made to this invention. Such, however, are considered to be within the scope of this invention.

What is claimed is:

1. A thermoplastic molding composition which comprises a blend of:
   (A) a copolymer having recurring units of a monoalkenyl aromatic monomer and recurring units of an α,β-ethylenically unsaturated dicarboxylic anhydride N-substituted imide, and (B) a hydrogenated elastomeric block copolymer having at least one substantially completely hydrogenated diene polymer mid block and at least two monoalkenyl arene polymer end blocks in which at least a portion of the arene groups contained in the end blocks are substituted with at least one substituent selected from the group consisting of nitro, cyano and the trifluoromethanesulfonyl.

2. A thermoplastic molding composition of claim 1 in which component (A) further comprises recurring units of a vinyl monomer selected from the group consisting of maleic anhydride, maleimide, acrylonitrile and methylmethacrylate.

3. The thermoplastic molding composition of claim 1 in which in component (A) said monoalkenyl aromatic monomer is selected from the group consisting of styrene, α-methylstyrene, t-butylstyrene and p-methylstyrene.

4. The thermoplastic molding composition of claim 2 in which in said component (A) said vinyl monomer is selected from the group consisting of maleic anhydride, maleimide, acrylonitrile and methylmethacrylate.

5. The thermoplastic molding composition of claim 1 in which said component (A) comprises in weight percent from about 35 to about 45 recurring units of monoalkenyl aromatic monomer and from about 35 to about 65 recurring units of an α,β-ethylenically unsaturated dicarboxylic anhydride N-substituted imide.

6. The thermoplastic molding composition of claim 2 in which in said component (A) comprises in weight percent from about 35 to about 45 recurring units of monoalkenyl aromatic monomer, from about 35 to about 65 recurring units of an α,β-ethylenically unsaturated dicarboxylic anhydride N-substituted imide and from about 1 to about 20 recurring units of a vinyl monomer.

7. The thermoplastic molding composition of claim 1 in which said component (A) has a number average molecular weight of from about 100,000 to about 700,000.

8. The thermoplastic molding composition of claim 2 in which said component (A) has a number average molcular weight of from about 100,000 to about 700,000.

9. The thermoplastic molding composition of claim 1 in which said component (A) has a number average molecular weight of from about 250,000 to about 450,000.

10. The thermoplastic molding composition of claim 2 in which said component (A) has a number average molecular weight of from about 250,000 to about 450,000.

11. The thermoplastic molding composition of claim 1 in which in said component (B) said arene polymer end blocks are 12 to 32% substituted with nitro moieties.

12. The thermoplastic molding composition of claim 1 in which in said component (B) said arene polymer end blocks are 12 to about 50% substituted with cyano moieties.

13. The thermoplastic molding composition of claim 1 in which in said component (B) said arene polymer end blocks are 15 to 32% substituted with triflurometthanesulfonyl moieties.

14. The thermoplastic molding composition of claim 1 in which in said component (B) said hydrogenated diene polymer mid block is selected from the group consisting of hydrogenated polybutadiene and hydrogenated polyisoprene.

15. The thermoplastic molding composition of claim 1 in which in component (B) said hydrogenated diene polymer mid block has a number average molecular weight of from about 20,000 to about 300,000.

16. The thermoplastic molding composition of claim 1 in which in component (B) said hydrogenated diene polymer mid block has a number average molecular weight of from about 80,000 to about 250,000.

17. The thermoplastic molding composition of claim 1 comprising in weight percent from about 99 to about 1 of component (A) and from about 1 to about 99 of component (B).

18. The thermoplastic molding composition of claim 1 comprising in weight percent from about 99 to about 60 of component (A) and from about 1 to about 40 of component (B).

19. The thermoplastic molding composition of claim 2 comprising in weight percent from about 99 to about 1 of component (A) and from about 1 to about 99 of component (B).

20. The thermoplastic molding composition of claim 2 comprising in weight percent from about 99 to about 60 of component (A) and from about 1 to about 40 of component (B).

21. A method of producing a molded composition which comprises forming a blend of (A) a copolymer of recurring units of a monoalkenyl aromatic monomer and recurring units of an α,β ethylenically unsaturated dicarboxylic anhydride N-substituted imide and (B) a selectively hydrogenated elastomeric block copolymer having at least one substantially completely hydrogenated diene polymer mid block and at least two monoalkenyl arene polymer end blocks in which at least a portion of the arene groups contained in the end block are substituted with at least one substituent selected from the group consisting of nitro, cyano and trifluromethonesulfonyl, and molding the resulting blend.

22. A molded composition comprising a continuous phase comprising a copolymer having recurring units of a monoalkenyl aromatic monomer and recurring units of an α,β-ethylenically unsaturated dicarboxylic anhydride N-substituted imide and a disperse phase within the continuous phase, the disperse phase being a hydrogenated elastomeric block copolymer having at least one substantially completely hydrogenated diene polymer mid block and at least two monoalkenyl arene polymer end blocks in which at least a portion of the arene groups contained in the end blocks are substituted with at least one substituent selected from the group consisting of nitro, cyano and trifluromethanesulfonyl.

23. The molded composition of claim 22 in which in said continuous phase said copolymer further comprises recurring units of a vinyl monomer.

24. A thermoplastic molding composition which comprises a blend of:
(A) a copolymer having recurring units of a monoalkenyl aromatic monomer, recurring units of an α,β-ethylenically unsaturated dicarboxylic anhydride N-substituted imide, and recurring units of a vinyl monomer selected from the group consisting of maleic anhydride, maleimide, acrylonitrile and methylmethacrylate, and
(B) a hydrogenated elastomeric block copolymer having at least one substantially completely hydrogenated diene polymer mid block and at least two monoalkenyl arene polymer end blocks in which at least a portion of the arene groups contained in the end blocks are substituted with at least one substituent selected from the group consisting of nitro, cyano and trifluoromethanesulfonyl.

* * * * *